INVENTOR
J. M. MOORE
J. O. MOTSENBOCKER
BY
Young & Quigg
ATTORNEYS

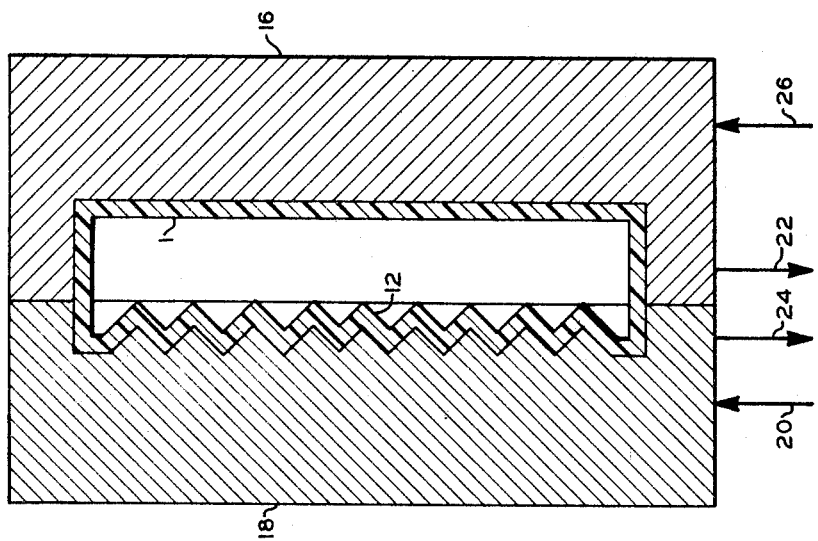
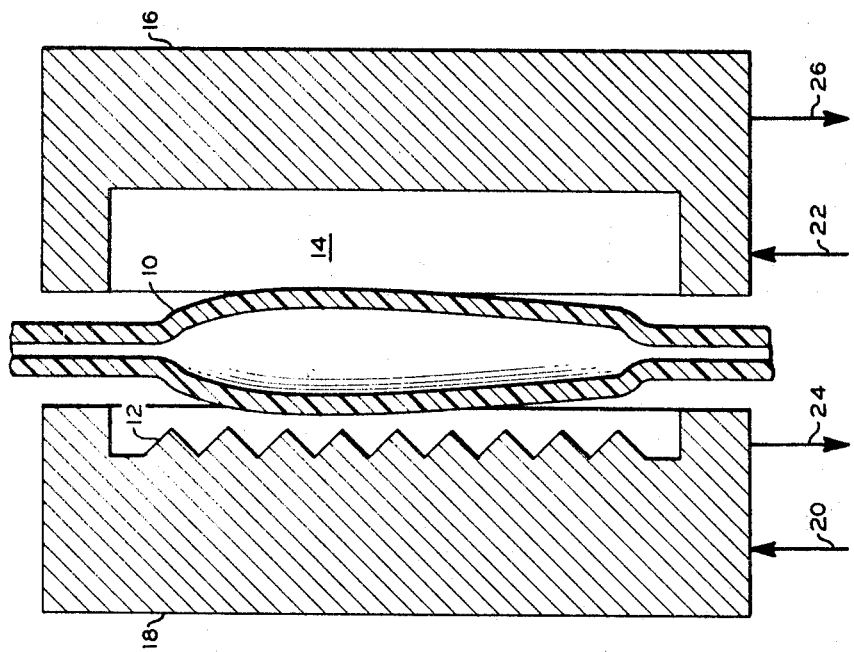

United States Patent Office 3,444,284
Patented May 13, 1969

3,444,284
UNIFORM COOLING OF BLOW MOLDED ARTICLES
John M. Moore and James O. Motsenbocker, Bartlesville, Okla., assignors to Phillips Petroleum Company, a corporation of Delaware
Filed Apr. 7, 1966, Ser. No. 540,992
Int. Cl. B29c *17/04, 1/00*
U.S. Cl. 264—94                                         3 Claims

ABSTRACT OF THE DISCLOSURE

In a blow molding operation wherein a portion of the resulting article is to be cut out, and wherein said portion to be cut out would otherwise be thicker, as a result of being stretched less than other portions of the parison, the wall of the mold forming that portion of the parison which is to be cut out and discarded is corrugated so as to increase the surface area and therefore provide for thinning of the area to be discarded so that it will cool at the same rate as the rest of the article.

---

Figures 1, 2:
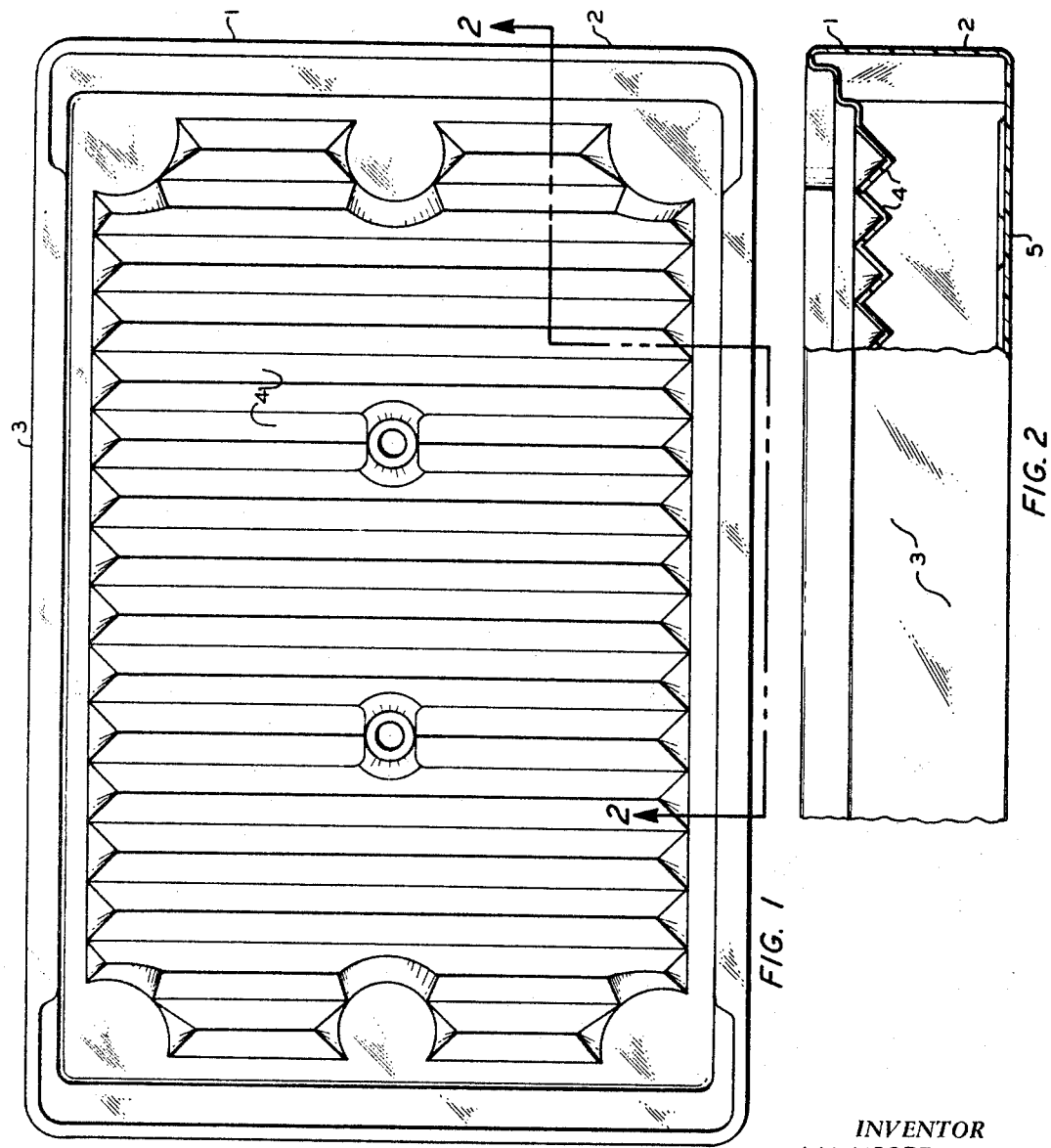

This invention relates to uniform cooling of blow molded articles. In one of its aspects, it relates to a method for blow molding a hollow object which has a surface area to be removed, the method comprising blowing a parison such that the surface area to be removed forms a corrugated shape, cooling the blown parison, and removing the corrugated area. In another of its aspects, the invention relates to a method for blow molding an open top bottle carrier wherein a parison is blown to the shape of the bottle carrier, the top surface of the bottle carrier has formed therein during the blow molding operation a corrugated surface, and the corrugated surface is removed from the cooled, blown carrier.

In the production of open top carriers according to U.S. Patent 3,263,009 to Vidal, it has been found that the top wall which is to be removed is thicker than the rest of the carrier. Accordingly, it cools slower than the rest of the article. The thicker section covering the top wall retains more heat than the rest of the carrier, and the heat subsequently migrates to the thinner portion of the carrier after it is removed from the mold causing warping of the article.

I have now discovered that if the thickness of the top wall can be decreased by providing a corrugated top wall surface so that more of the top wall surface will be in contact with the mold surface, that the slow cooling of the top wall will be eliminated with the corresponding reduction of distortion of the finished product.

By various aspects of this invention, one or more of the following or other objects can be obtained.

It is an object of this invention to provide a method for reducing the distortion of blow molded articles due to uneven cooling of thicker areas of the blown article.

It is a further object of this invention to provide a method for blow molding a one-piece top carrier wherein distortion from the top surface cooling is minimized.

Other aspects, objects and the several advantages of this invention are apparent to one skilled in the art from a study of this disclosure, the drawing and the appended claims.

According to the invention, an article is blow molded and stresses resulting from the cooling of uneven thicknesses of wall portions of the blown article are minimized by providing a corrugated surface in the thicker areas. The corrugated area is then removed from the article. The increased surface area due to the corrugation decreases the thickness of the corrugated area and provides more surface contact between that area and the mold surface, thereby providing a greater heat transfer area.

In one embodiment of the invention, a one-piece, open top bottle carrier is made according to the invention. The top surface, which normally is thicker than the other parts of the carrier and is subsequently removed from the carrier after the molding operation, is provided with a corrugated top surface. Preferably, the surface is V-shaped. The corrugations can be any shape, although V-shapes are preferred. The corrugations accordingly can be any shape which will reduce the thickness of the wall and will provide greater area of contact between the mold and the wall.

The invention will now be described with reference to the accompanying drawing in which FIGURE 1 shows a top view of an article produced according to the invention after the molding operation; FIGURE 2 is a sectional view through line II—II of FIGURE 1; FIGURES 3 and 4 are cross sections through a mold showing successive stages of the molding operation to illustrate the method and apparatus of the invention.

Referring now to FIGURE 1, a blow molded bottle carrier having end walls 2, side walls 3, bottom wall 5, and top wall 4 is shown. The top wall has a plurality of V-shaped corrugations provided therein. The top surface 4 will be removed to provide a one-piece open top blow molded carrier.

Referring now to FIGURES 3 and 4, a parison 10 is introduced between mold halves 16 and 18 having mold cavity 14. A plurality of corrugations 12 are provided on one surface of mold cavity 14. Means for supplying cooling fluid 20 and 22 are provided in each mold half, and means for withdrawing the cooling fluid 24 and 26 are also provided in each mold half. The cooling is provided to maintain the mold halves at a constant temperature.

The parison 10 is inserted between the mold halves which close, thereby pinching off the parison. Suitable blowing means (not shown) are provided to blow the parison into a finished article having a corrugated wall. The blown article is cooled uniformly and removed from the mold. The corrugated surface can then be removed.

During the molding operation, after the blowing has been completed, cooling fluid such as expanding $CO_2$ and/or water can then be introduced into the interior of the blown object to aid in the cooling of the article.

The articles made according to this invention can be made from any suitable moldable polymer such as synthetic thermoplastic material including polyethylene, polypropylene, polybutene-1 and copolymers thereof, polystyrene, polyvinyl chloride and the like. The preferred material is high density polyethylene such as that produced by a method disclosed and claimed in U.S. Patent 2,825,721, issued Mar. 1, 1958, to Messrs. Hogan and Banks.

Reasonable variation and modification are possible within the scope of the foregoing disclosure, the essence of which is that there has been provided a method and apparatus for preventing distortion due to uneven cooling from thicker portions of the blown article, which thicker portion is adapted to be cut out by providing corrugations in the thicker portion during the blowing operation, thereby making the portion thinner and allowing more heat transfer area between the portion and the molds.

We claim:
1. A method for preventing distortion due to uneven cooling from thicker wall portions of blown articles, which thicker wall portions are adapted to be cut from the molded article, the method comprising imparting corrugations in said wall portions during the blowing step to thereby make said wall portions thinner and allow more heat transfer area between said wall portions and a mold surface, and removing the thus formed corrugated wall portions.
2. A method according to claim 1 wherein said article is a bottle carrier and said portion is the top surface thereof.

3. A method according to claim 2 wherein said mold is cooled and maintained at a constant temperature during the blowing step.

References Cited

UNITED STATES PATENTS 3,263,009 7/1966 Vidal _____ 264—98
3,278,666 10/1966 Donald _____ 264—94

OTHER REFERENCES

Modern Plastics, August 1965, pp. 76–78 relied on.

ROBERT F. WHITE, *Primary Examiner.*

T. J. CARVIS, *Assistant Examiner.*

U.S. Cl. X.R.

18—5; 264—154